Sept. 10, 1957 P. G. GILBERT 2,805,894
WHEEL WITH SPOKES IN RADIAL TENSION
Filed Dec. 9, 1952
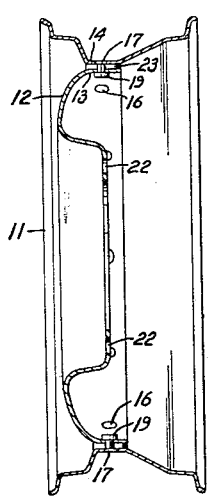
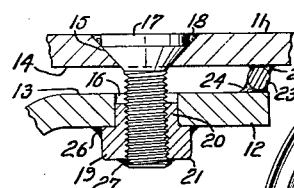
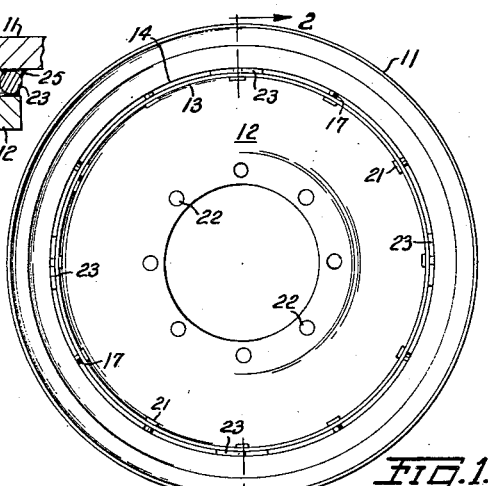
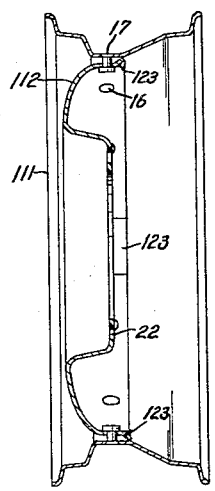
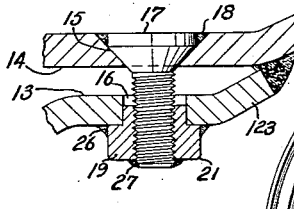
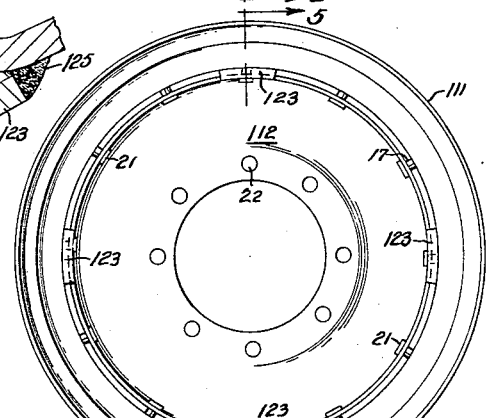
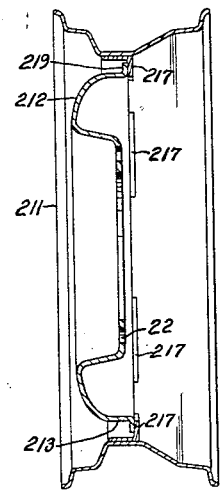
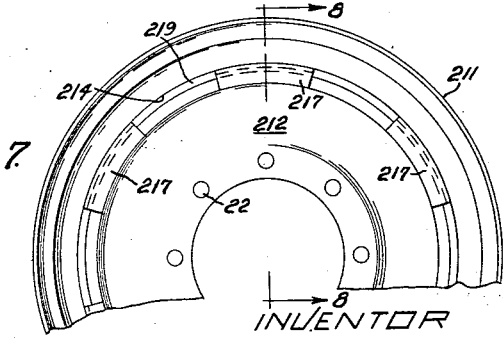
INVENTOR
PHILO G. GILBERT
BY
AGENT

United States Patent Office 2,805,894
Patented Sept. 10, 1957

2,805,894

WHEEL WITH SPOKES IN RADIAL TENSION

Philo G. Gilbert, Portland, Oreg.

Application December 9, 1952, Serial No. 324,984

21 Claims. (Cl. 301—55)

This invention relates generally to wheels and more specifically to wheels surmounted with pneumatic tires and adapted to automotive vehicular service.

It has long been known that for some reason wheels with tension spokes like the wire spoke wheels used on the common bicycle are more shock absorbent and are easier to propel than are equivalent size solid wheels and wheels of this type were used on early models of self propelled highway vehicles. However for various reasons such as first cost, small wheels to lower the center of gravity of the car, large tires to absorb road unevenness, and large brake drums and hubs required for safety as the car speeds became greater, the more desirable tension spoke wheel of the bicycle wheel type has been displaced by the solid or disk type of wheels.

Reference is here made to my previous work with resilient wheels of which my United States Patent Number 2,628,651 is a successful type. The wheel of that application has been found to be markedly superior in performance to the disk type of wheel and to attain this superior performance the hub and rim are connected by sensibly rigid but operationally resilient suspension units radiating to the rim tangentially of the hub. This wheel requires a certain amount of radial space between the hub and the rim and to use them also requires that right hand and left hand wheels be supplied. Both of these requirements make the wheel unadaptable for certain commercial uses.

To overcome these disadvantages of my previous wheel I have invented and here disclose a wheel with spokes in radial tension which I have found to retain the advantages of my previous wheel without retaining the above noted disadvantages.

It is a principal object of this invention to provide a sensibly rigid but operationally resilient wheel for automotive vehicles which can be interchanged to any of the four wheel positions of the vehicle.

It is a second object to provide such a wheel to which the parts of the type of wheel now usually supplied as original equipment on automotive vehicles can be readily and economically converted.

It is a third object to provide such a wheel in which the parts connecting the hub and rim of the wheel to transfer the hub load to the rim will be in tension at all times.

It is therefore a fourth object to provide a wheel in which the hub load hangs from the top half of the rim rather than rests on the lower half of the rim.

It is a fifth object to provide a wheel having means inherent in the wheel during fabrication thereof to place the parts connecting the hub and rim in tension.

It is a sixth object to provide such a wheel in which the characteristic parts take up the least possible radial space between the hub and rim.

It is a seventh object to provide such a wheel having spokes in radial tension.

It is an eighth object to provide such a wheel in which the rim and hub may be solidly connected in a plane offset from the load carrying plane in order to provide means for eliminating axial movement of the rim with respect to the hub.

It is a ninth object to provide an easy and economical method of making such a wheel.

How these and other objects are attained is disclosed in the following description referring to the attached drawing in which:

Fig. 1 is a view in elevation of one of the forms of the wheel of this invention.

Fig. 2 is a sectional elevation of the wheel of Fig. 1 along the line 2—2 of Fig. 1.

Fig. 3 is a fragmentary enlarged section of the similar parts of Fig. 2.

Fig. 4 is a view in elevation of another form of the wheel of this invention.

Fig. 5 is a sectional elevation of the wheel of Fig. 4 along the line 5—5 of Fig. 4.

Fig. 6 is a fragmentary enlarged section of the similar parts of Fig. 5.

Fig. 7 is a fragmentary view in elevation of still another form of the wheel of this invention.

Fig. 8 is a complete sectional elevation of the wheel of Fig. 7 along the line 8—8 of Fig. 7.

Like numerals of reference refer to like parts in the several figures of the drawing.

Referring now to the drawing in Figs. 1 and 2 there is shown an automobile wheel having a rim 11 of a type now in common use and adapted to support about its periphery a pneumatic tire in the usual manner. Inside the rim 11 is shown a hub 12 of a general type now in common use but attached to the rim 11 in a manner singular to my invention. In the commonly used wheels of present day automobiles the outer cylindrical surface 13 of hub 12 is substantially of the same diameter as the inner cylindrical surface 14 of the rim 11 so that these two surfaces fit snugly together. Then in these common wheels the rim is held to the hub by riveting or welding or both along the surfaces 13 and 14.

However in the wheel of this invention the outer cylindrical surface 13 of hub 12 is materially smaller in diameter than the inner cylindrical surface 14 of rim 11. In one form of my wheel that has been found to be desirable the radial distance between surfaces 13 and 14 is about one fourth inch. Along the center lines of the surfaces 13 and 14 as shown in the drawing Figs. 1, 2 and 3 both the rim 11 and the hub 12 are perforated with holes 15 and 16 respectively, equally spaced about the axis of the wheel in a plane perpendicular thereto.

The holes 15 in rim 11 are countersunk as shown in Fig. 3 to receive the heads of flat head machine screws 17. The shanks of screws 17 extend through holes 16 and are threadedly engaged by nuts 19 each having a reduced section 20 under the head 21. The reduced section 20 of nut 19 makes a turning fit with hole 16 in hub 12.

Holes 22 in hub 12 are for the purpose of securing wheel hub 12 to the brake drum or other appropriate wheel mounting means of the vehicle as is well known in the art.

When the hub 12 has been positioned in rim 11 with screws 17 in place and engaged by nuts 19, the nuts 19 are set up snugly on screws 17 to put screws 17 in considerable tension and to give a uniform spacing of surface 13 and 14 all around the wheel. Then each of the nuts 19 are further turned with a torque indicating wrench to set up the desired tension in screws 17. After this, screws 17 are welded to rim 11 as shown at 18.

It is seen that with a wheel constructed as here described and with the required uniform tensioning of screws 17, when the wheel is in use the weight applied to the wheel hub by the car axle will hang on the upper half of the wheel rim, thus increasing the tension in the screws above the horizontal plane through the wheel axis and reducing but not eliminating the tension in the screws below that plane. It is this characteristic of the wheel, to apply the load to the top of the wheel rather than to the bottom as it has been commonly applied, which gives the wheel its desirable features of easier rolling and easier braking under load, easier steering and ability to roll over obstacles which skid against ordinary wheels, together with a marked saving in motive fuel.

However with only the tension screws applied along a plane perpendicular to the wheel axis the wheel will lack sway stability and this is overcome in my wheel in the following manner. Short lengths of rod 23 equally spaced around the wheel as shown are first welded as shown at 24, Fig. 3 to the edge of the surface 13 of hub 12. This is done before the hub is assembled to the rim in the above described manner. Rods 23 are smaller in diameter than the spacing between surfaces 13 and 14 by up to one sixteenth of an inch. When the wheel has been assembled with screws 17 welded at 18 to rim 11 and the desired tension has been placed on screws 17 then rods 23 are welded as at 25 to rim 11. During this welding the edge of rim 12, the rods 23, and the welding metal are hot and in an expanded condition. When the welding is complete and the materials cool and shrink the material of rods 23 is strained in tension between hub 12 and rim 11. However, rods 23 are offset from screws 17 a sufficient distance not to interfere with the normal functions of the screws. The main purpose of rods 23 is to give lateral stability to the wheels, while the placement and method of placement of rods 23 is to obtain this lateral stability of the wheel without interfering with the above noted operation of the tension spokes or screws 17.

After rods 23 have been welded to both the hub 12 and rim 11 and the parts have cooled, the torque wrench is again applied to nuts 19 and any necessary adjustments are made in the positions of nuts 19 to give screws 17 the uniform tension desired. Then nuts 19 are secured in place by welding to hub 12 at 26 and to screw 17 at 27. The wheel is now complete.

It is readily seen that while my wheel is simple to construct as a new wheel it can also readily be made by conversion from the commonly used wheel. To do this the connection between the hub and rim of the old wheel is broken and the outer cylindrical part of the hub is cut off to give the required clearance between the hub and rim. Then a new cylindrical band of the desired reduced diameter is welded onto the hub and the wheel is completed in the manner above described for making a new wheel.

A variant form of my wheel is shown in Figures 4, 5, and 6. In this form the functions of the rods 23 are taken over by ears 123 of equivalent length formed outwardly from the slit cylindrical edge of hub 112. Otherwise the manufacture of this form of my wheel is the same as above described for the form shown in Figs. 1, 2, and 3. It is to be noted that at the proper point in the building of the wheel welding 125 will take the place of welding 25 of the previous form.

A third form of my wheel is shown in Figs. 7 and 8. This also is a tension stressed spoke wheel but in this case the tensioning of the spokes is accomplished entirely by heat.

As shown in Figs. 7 and 8, rim 211 has secured to its inner cylindrical surface 214, a series of equally spaced spoke clips 217. Hub 212 is formed with a short radial flange 219 at the free edge of cylindrical outer surface 213. With rim 211 maintained at normal temperature, hub 212 is heated to approximately six hundred degrees Fahrenheit, the two parts are assembled concentrically as shown in Figs. 7 and 8 and clips 217 are welded to flange 219. The parts are then allowed to cool thus setting up the desired tension between rim 211 and hub 212 through spoke clips 217.

Having thus disclosed the objects of my invention, described three forms in which the wheel of my invention may, among others, be produced, and explained its novelty and utility, I claim:

1. A unitary wheel structure consisting of a hub structure, a rim structure encircling said hub structure and coaxial therewith, a plurality of rim suspension units angularly equally spaced about said hub structure in a first plane normal to the axis of said wheel and a plurality of rim suspension units angularly equally spaced about said hub structure in a second plane parallel to but offset from said first plane, said rim suspension units at all times being radially strained in tension between said hub structure and said rim structure in their respective planes.

2. The wheel of claim 1 in which said rim structure has a cylindrical inner surface perforated with a plurality of equally spaced radial holes having their centers in a plane normal to the axis of said wheel, said outer cylindrical surface of said hub being perforated with a plurality of equally spaced holes registered radially with said holes in said rim structure, and each of said rim suspension units comprising a machine screw extending radially through one of said holes in said rim structure and the said registering hole in said hub structure, together with a nut threaded on said screw whereby all of said screws can be equally strained in tension between said unitary hub structure and said unitary rim structure and said screw being secured to said rim structure and said nut being secured to said hub structure whereby said unitary rim secured to said unitary hub by said screw suspension units will form a sensibly rigid wheel with said rim concentric with said hub and said screws in radial tension at all times.

3. A unitary wheel structure consisting of a rim structure, a hub structure within said rim structure concentric therewith and spaced therefrom and a plurality of radial means uniformly spaced about the axis of said wheel, said radial means at all times being strained in radial tension between said hub structure and said rim structure and said radial means being normally unstrained tangentially and axially between said hub structure and said rim structure.

4. A wheel structure consisting of a hub structure, an encircling rim structure concentric with said hub structure and spaced radially therefrom, together with a plurality of rim suspension units angularly spaced around said hub structure between said hub structure and said rim structure, all of said rim suspension units being secured to both said hub structure and said rim structure and strained in radial tension therebetween at all times.

5. A vehicle wheel consisting of a rim structure adapted to form a rigid base on which a pneumatic tire can be secured for resiliently supporting said wheel, a unitary hub structure radially spaced inwardly of said rim structure and concentric therewith, and a plurality of rim suspension means symmetrically spaced about said hub structure between said hub structure and said rim structure each of said rim suspension means being secured to both said hub structure and said rim structure and strained in radial tension therebetween at all times.

6. A vehicle wheel consisting of a rim structure adapted to form a rigid base on which a pneumatic tire can be secured resiliently to support said wheel on a road surface, a unitary hub structure radially spaced inwardly of said rim structure and concentric therewith, and a plurality of symmetrically spaced tension elements, each of said tension elements being secured to both said hub structure and said rim structure and radially strained therebetween at all times to form therewith a sensibly rigid wheel.

7. The wheel of claim 6 in which each of said tension elements are mechanically strained in radial tension between said hub structure and said rim structure.

8. The wheel of claim 6 in which each of said tension elements are thermally strained in radial tension between said hub structure and said rim structure.

9. The wheel of claim 6 in which one group of said tension elements is symmetrically arranged about the axis of said wheel and mechanically strained in radial tension between said hub structure and said rim structure and another group of said tension elements is symmetrically arranged about the axis of said wheel and thermally strained in radial tension.

10. A wheel comprising a unitary hub structure having a cylindrical outer surface, a rim structure having a cylindrical inner surface uniformly spaced about said cylindrical outer surface of said hub structure to form an annular gap of short radial depth therebetween and a plurality of spoke means radially spanning said annular gap and equally spaced circumferentially of said gap, said spoke means being permanently fixed to both said hub structure and said rim structure and strained permanently in tension therebetween to form therewith a permanently unitary wheel structure.

11. A wheel comprising a hub structure, a rim structure symmetrically radially spaced from and outside said hub structure and a plurality of circumferentially spaced tension members permanently secured at one end to said hub structure and at the other end to said rim structure, said tension members being permanently secured to said hub and rim structures with said hub structure radially strained toward said rim, said tension members being in tension at all times within the rated load of said wheel and said wheel being an essentially integral sensibly rigid structure.

12. The wheel of claim 11 in which each of said tension members includes a machine bolt with the head welded to said rim and the nut welded to said hub.

13. The wheel of claim 11 in which said tension members include overlapping radial flange elements on said hub structure and said rim structure and said flange elements on said hub structure and said flange elements on said rim structure being permanently secured together with said flange elements in radial tension at all rated loads of said wheel.

14. A permanently single piece wheel structure for an automotive vehicle consisting of an outer rim structure, an inner deformed disk structure and a plurality of spaced radial tension members supporting said disk structure on said rim structure.

15. The wheel structure of claim 14 in which said deformed disk structure is coaxial with said rim structure and said rim is formed on its outer peripheral surface to removably support and retain a pneumatic tire.

16. The wheel structure of claim 15 in which said deformed disk structure is adapted to be removably secured to a wheel brake drum of an automotive vehicle with said pneumatic tire coaxial with the axis of said drum.

17. The wheel structure of claim 16 in which the lines of tensile stress of said spaced tension members radiate from said disk to said rim substantially in a plane normal to the axis of said wheel.

18. The wheel structure of claim 16 in which some of the lines of tensile stress of said spaced tension members radiate from said disk to said rim substantially in a first plane normal to the axis of said wheel.

19. A unitary wheel structure comprising a hub, a rim surrounding said hub to be coaxial therewith and radially connected therewith by first means for mechanically setting up circumferentially spaced radial tension stresses between said hub and said rim and second means for thermally setting up circumferentially spaced radial tension stresses permanently between said hub and said rim.

20. A unitary wheel structure at an intermediate stage of its construction comprising a hub, a rim surrounding said hub to be coaxial therewith and circumferentially interrupted radially overlapping spoke means cooperatively formed on said hub and said rim, said hub being at a temperature greatly elevated with respect to the temperature of said rim and said hub and said rim being permanently secured together at the overlapping sections of said spoke means.

21. A unitary wheel structure at an intermediate stage of its construction comprising a steel hub, a steel rim surrounding said hub to be coaxial therewith and radially connected therewith by first means for mechanically setting up circumferentially spaced radial tension stresses between said hub and said rim and second means for thermally setting up circumferentially spaced radial tension stresses between said hub and said rim said second means comprising weld metal at greatly elevated temperatures connecting said hub and said rim.

References Cited in the file of this patent

UNITED STATES PATENTS

| | | |
|---|---|---|
| 560,509 | Libbey | May 19, 1896 |
| 1,090,087 | Robinson | Mar. 10, 1914 |
| 1,311,468 | Saunders | July 29, 1919 |
| 1,474,631 | House | Nov. 20, 1923 |
| 1,887,513 | Nelson | Nov. 15, 1932 |
| 2,037,871 | Zander | Apr. 21, 1936 |

FOREIGN PATENTS

| | | |
|---|---|---|
| 778,269 | France | Dec. 15, 1934 |